United States Patent [19]

Naito et al.

[11] Patent Number: 4,591,618

[45] Date of Patent: May 27, 1986

[54] ANAEROBIC ADHESIVE COMPOSITION COMPRISING MODIFIED UNSATURATED POLYMER AND (METH)ACRYLIC ACID

[75] Inventors: Kazuo Naito, Kawasaki; Tadashi Fuse, Higashimurayama; Itsuo Tanuma, Tokorozawa; Yukio Fukuura, Kawagoe; Hikaru Ishikawa, Kokubunji, all of Japan

[73] Assignee: Bridgestone Tire Co., Ltd., Tokyo, Japan

[21] Appl. No.: 476,970

[22] PCT Filed: Jul. 20, 1982

[86] PCT No.: PCT/JP82/00279

§ 371 Date: Mar. 18, 1983

§ 102(e) Date: Mar. 18, 1983

[87] PCT Pub. No.: WO83/00341

PCT Pub. Date: Feb. 3, 1983

[30] Foreign Application Priority Data

Jul. 20, 1981 [JP] Japan .................. 56-112209

[51] Int. Cl.$^4$ .................. C08F 271/02; C08F 277/00; C08F 259/02

[52] U.S. Cl. .................. 525/279; 525/289; 525/292; 525/297; 525/301

[58] Field of Search .................. 526/317; 525/302

[56] References Cited

U.S. PATENT DOCUMENTS

| | | | |
|---|---|---|---|
| 3,542,587 | 11/1970 | Aronoff | 525/309 |
| 3,887,653 | 6/1975 | Konishi et al. | 526/317 |
| 4,065,521 | 12/1977 | Tachowicz et al. | 525/310 |

FOREIGN PATENT DOCUMENTS

| | | | |
|---|---|---|---|
| 52-71590 | 6/1977 | Japan . | |
| 53-6198 | 3/1978 | Japan | 525/302 |
| 55-84307 | 6/1980 | Japan . | |
| 57-159864 | 2/1982 | Japan | 525/302 |
| 2014173 | 8/1979 | United Kingdom | 525/302 |

*Primary Examiner*—Joseph L. Schofer
*Assistant Examiner*—Peter F. Kulkosky
*Attorney, Agent, or Firm*—Birch, Stewart, Kolasch & Birch

[57] ABSTRACT

An anaerobic adhesive composition comprises a polymer having a polymerizable side chain and a molecular weight of at least 500, an organic acid having a vinyl or methacryl group and polymerizable with said polymer, a polymerization catalyst, and preferably, a vinyl monomer. The composition is used for bonding various adherends such as metals, plastics, FRP, glass, etc. and provides improved bond strength, water resistance, heat resistance, and fatigue resistance.

18 Claims, No Drawings

ANAEROBIC ADHESIVE COMPOSITION COMPRISING MODIFIED UNSATURATED POLYMER AND (METH)ACRYLIC ACID

DESCRIPTION

1. TECHNICAL FIELD

This invention relates to a novel anaerobic adhesive composition. More particularly, this invention relates to an anaerobic adhesive composition which is useful in bonding various adherends such as metals, plastics, FRP, glass, etc.

2. BACKGROUND ART

In these years, adhesives which are quickly curable at room temperature without the need for troublesome handling such as quantitative mixing have made a great advance. Particularly, anaerobic adhesives comprising an acrylate or methacrylate as one component, rubber-modified acryl adhesives of the first generation, rubber-modified acryl adhesives of the second generation (to be abbreviated as SGA), and the like appeared in succession.

Japanese Patent Application Publication No. 29-3348 discloses that an ester such as tetraethylene glycol dimethacrylate quickly cures under anaerobic conditions. Such adhesives capable of polymerizing and curing under anaerobic conditions are called anaerobic adhesives and commercially recommended for use in thread locking, shaft fitting and similar purposes. A further advance resulted in an anaerobic adhesive which found a structural application. When used in structural application, these anaerobic adhesives, however, have many problems in that they are expensive and poor in water and heat resistance, their gap-filling properties are generally low, and a squeeze-out portion does not cure and remains tacky, causing impediments to aesthetic appearance and application.

Also, Japanese Patent Application Publication No. 53-41699 discloses a composition based on a high-molecular weight material having a chlorosulfonyl group on its side chain and a polymerizable vinyl monomer and further comprising additional agents such as a radical forming agent, accelerator, etc., which composition is an adhesive quickly curable at room temperature. This composition appeared in the market as SAGA. Although this adhesive has many features in that it cures at room temperature, it is not necessary to mix metered amounts of two components as common room temperature curable epoxy adhesives often require, and it has high bond strength and impact resistance, it is still insufficient in heat resistance, retention of adhesion at high temperatures, fatigue resistance, tensile bond strength, and the like.

SUMMARY OF INVENTION

As a result of extensive investigations to provide an anaerobic adhesive composition free of the above-mentioned shortcomings, the inventors have discovered that an anaerobic adhesive composition formulated by incorporating a polymerizable organic acid or a polymerizable organic acid and a vinyl monomer into a composition consisting of at least one polymerization catalyst and a polymer having a polymerizable side chain and a molecular weight of at least 500 exhibits substantially improved characteristics including heat resistance, retention of adhesion at high temperatures, tensile bond strength, fatigue resistance at bonded joints, and non-tackiness of squeezed-out adhesive, completing the present invention.

Accordingly, it is an object of the present invention to provide a novel anaerobic adhesive composition which has improved shear bond strength and tensile bond strength, and good water, heat, and fatigue resistances, and exhibits no tackiness when squeezed out.

According to the present invention, there is provided an anaerobic adhesive composition which is formulated by incorporating into a composition consisting of a polymer having a polymerizable side chain and a molecular weight of at least 500 and at least one polymerization catalyst, an organic acid having a vinyl or methacryl group and polymerizable with said composition, achieving the above object.

In a preferred embodiment of the present invention, the composition further comprises a vinyl monomer in addition to the above-mentioned components.

The above and other objects, features, and advantages of the present invention will become more apparent from the following description.

BEST MODE FOR CARRYING OUT THE INVENTION

The anaerobic adhesive composition of the present invention comprises
(1) a polymer having a polymerizable side chain and a molecular weight of at least 500,
(2) an organic acid having a vinyl or methacryl group which is polymerizable with said polymer, and
(3) a polymerization catalyst. Preferably, in addition to components (1), (2), and (3), there is incorporated
(4) a vinyl monomer.

The polymer having a polymerizable side chain and a molecular weight of at least 500 which is used in the adhesive composition of the invention as the first component may be prepared by the method proposed by the inventors and disclosed in Japanese Patent Application Publication No. 53-6198. More specifically, the polymer is obtained by reacting a material having a carbon-to-carbon unsaturated double bond and a molecular weight of at least 500 with at least one of the polymerizable unsaturated monomers represented by the general formulas:

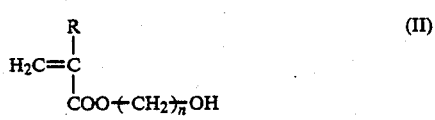

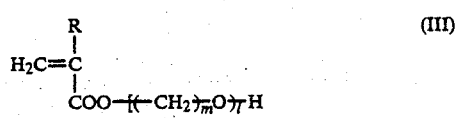

wherein R represents a hydrogen atom or methyl group, n is an integer selected from 2 to 5, m is an integer selected from 1 to 4, and l is an integer selected from 1 to 30, in the presence of an alkyl hypohalite or an N-haloamide compound represented by the general formula:

wherein X represents a halogen atom, A represents a carboxylic acid residue, sulfonic acid residue or carbonic acid monoester, and B represents a hydrogen atom, halogen atom or carboxylic acid residue.

The material having a carbon-to-carbon unsaturated double bond and a molecular weight of at least 500 may be selected from a wide range of materials having a carbon-to-carbon unsaturated bond in their main or side chain and a molecular weight of at least 500. Examples of these materials include natural rubber, polyisoprene, polybutadiene, polychloroprene, butadiene-styrene copolymers, butadiene-acrylonitrile copolymers, butadiene-acrylic acid copolymers, butadiene-methacrylic acid copolymers, butadiene-methyl acrylate copolymers, butadiene-methyl methacrylate copolymers, butadiene-vinyl pyridine-styrene copolymers, ethylene-propylene-cyclopentadiene copolymers, ethylene-propylene-5-ethylidene-2-norbornene copolymers, ethylene-propylene-1,4-hexadiene copolymers, isobutylene-isoprene copolymers, halogenated or highly unsaturated derivatives of isobutylene-isoprene copolymers, norbornene ring-opened polymers, and the like, and one or a combination of two or more of them may be used. When the material having a carbon-to-carbon unsaturated double bond and a molecular weight of at least 500 is reacted with an organic acid represented by the general formula:

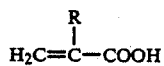

wherein R represents a hydrogen atom or methyl group, in the presence of the above-mentioned alkyl hypohalite or N-haloamide, the reaction proceeds according to the following scheme, for example.

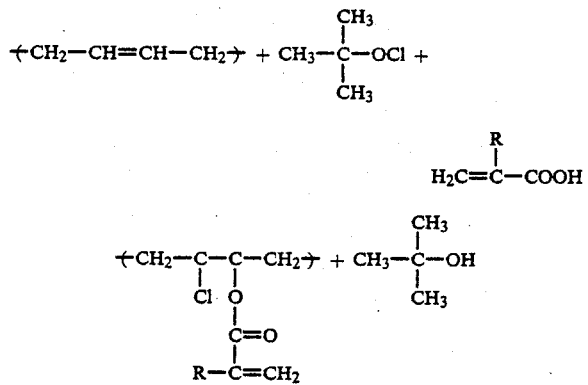

For the purpose of the present invention, the introduction of such a side chain as an acryloyloxy or methacryloyloxy group is effected such that the organic acid of the general formulas (I)-(III) or an alcohol derived therefrom may be present in an amount of 1/100 to 1/5000 molar equivalent based on the weight of the material having a carbon-to-carbon unsaturated double bond and a molecular weight of 500. The resulting polymer gels with the amount of the organic acid exceeding 1/100 molar equivalent, whereas amounts of less than 1/5000 molar equivalent offer an insignificant effect of introducing a side chain in a substantial sense. The particularly preferred range is from 1/200 to 1/3000 mol.

In preparing a polymer (first component) in which the polymerizable side chain such as a methacryloyloxy or acryloyloxy group is present in an amount of 1/100 to 1/5000 molar equivalent, more preferably 1/200 to 1/3000 molar equivalent per unit weight of the material having a carbon-to-carbon unsaturated double bond and a molecular weight of at least 500, that is, a polymer in which the material having a carbon-to-carbon unsaturated double bond and a molecular weight of at least 500 has a rate of modification of 1/100 to 1/5000, more preferably 1/200 to 1/3000, the reaction may be carried out by adding the polymerizable unsaturated monomer in a given amount meeting the above-specified molar equivalent range. Alternatively, the above-specified modification rate range may be reached by adjusting the amount of the alkyl hypohalite or N-haloamide used. That is, the reaction may be carried out by adding an excess amount of the polymerizable unsaturated monomer while adding the alkyl hypohalite or N-haloamide in such an amount that the amount thereof used in the reaction of the polymerizable unsaturated monomer may become a given amount falling in the above-specified molar equivalent range, thereby introducing the side chain in a given amount within the above-specified range. In this case, the excess of the polymerizable unsaturated monomer which has not participated in the reaction remains in the reaction product.

Further, this reaction is often carried out in a solution system in which the material having a molecular weight of at least 500 is dissolved in a suitable solvent, although the material which is normally available in liquid or viscous form may, of course, be used in the reaction without dissolution. The solvent used herein may be selected from those solvents in which not only the material having a molecular weight of at least 500 is readily soluble, but also the alkyl hypohalite or N-haloamide and the polymerizable unsaturated monomer are stably soluble, and they may be used alone or in admixture. Examples of the solvents include aliphatic solvents such as pentane, hexane, heptane, octane, etc., cycloaliphatic solvents such as cyclohexane, aromatic solvents such as benzene, nitrobenzene, halobenzenes, toluene, xylene, etc., ether solvents such as dioxane, tetrahydrofuran, etc., ester solvents such as ethyl acetate, methyl acetate, etc., ketone solvents such as methyl ethyl ketone, cyclohexanone, acetone, methyl isobutyl ketone, etc., halogenated hydrocarbon solvents such as methylene chloride, chloroform, carbon tetrachloride, etc., and the like, with the preferred solvents being toluene, benzene, tetrahydrofuran, acetone, dichloromethane, heptane, ethyl acetate, and methyl ethyl ketone.

As the solvent in which the material having a molecular weight of at least 500 is dissolved, one or more vinyl compounds may also be used as disclosed in Japanese Patent Application Publication No. 53-6198. Examples of the vinyl compounds include styrene and styrene derivatives such as α-methylstyrene, β-methylstyrene, divinylbenzene, etc., acrylic acid derivatives such as methyl acrylate, methyl methacrylate, tridecyl methacrylate, cyclohexyl methacrylate, tetrahydrofurfuryl methacrylate, dimethylaminoethyl methacrylate, lauryl methacrylate, glycidyl methacrylate, ethyl dimethacrylate, 1,3-butylene dimethacrylate, etc., acrylic acid, methacrylic acid, vinyl acetate, acrylonitrile, vinyl pyridine, and the like.

Furthermore, even when the material having a molecular weight of at least 500 is solid, the reaction may be carried out while mechanically kneading the material under high shearing force in the absence of a solvent or in the presence of one or more polymerizable vinyl monomers to impart an adequate viscosity to the material, as long as the material is relatively chemically stable and unsusceptible to gelation.

Examples of the organic acids of the general formulas (I) to (III) or their derivatives which react with the material having a molecular weight of at least 500 in the presence of the alkyl hypohalite or N-haloamide include acrylic acid, methacrylic acid, 2-hydroxyethyl acrylate, 2-hydroxyethyl methacrylate, and other monoesters such as polyethylene glycol acrylate, polyethylene glycol methacrylate, polytetramethylene glycol methacrylate, etc., with the preferred organic acids being acrylic acid and methacrylic acid.

The alkyl hypohalites and N-haloamides will be described in detail. Examples of the alkyl hypohalites include primary alkyl hypohalites, secondary alkyl hypohalites, and tertiary alkyl hypohalites, and among them, stable tertiary alkyl hypohalites such as tert. butyl hypochlorite, tert. butyl hypobromite and tert. amyl hypochlorite are preferred. As to the N-haloamides, mention may be made of N-haloamides having a carbonic acid monoester residue, for example, N,N-dichloroethylurethane, N,N-dichloromethylurethane, N,N-dichloropropylurethane, N,N-dichlorobutylurethane, N,N-dichloropentylurethane, N,N-dichlorohexylurethane, N,N-dibromomethylurethane, N,N-dibromoethylurethane, N,N-dibromopropylurethane, N,N-dibromobutylurethane, N,N-dibromopentylurethane, N,N-dibromohexylurethane, N,N-dichloroallylurethane, N,N-dichloroisopropylurethane, N,N-dichlorosec butylurethane, N,N-dichlorobenzylurethane, N,N-dichlorophenylurethane, N,N-dichloromethallylurethane, etc., and in addition, N,N,N',N'-tetrachloroethylene glycol biscarbamate and N,N,N',N'-tetrabromoethylene glycol biscarbamate may also be used. Typical of N-haloamides having a sulfonic acid residue are N,N-dichlorobenzenesulfonamide and N,N-dibromoresidue benzenesulfonamide. Other examples of the compound having an N,N-dihalosulfonamide group include N,N-dichloromethylsulfonamide, N,N-dibromomethylsulfonamide, N,N-dichloroethylsulfonamide, N,N-dibromoethylsulfonamide, N,N-dichloropropylsulfonamide, N,N-dibromopropylsulfonamide, N,N-dichloropentylsulfonamide, N,N-dibromopentylsulfonamide, N,N-dichlorohexylsulfonamide, N,N-dibromohexylsulfonamide, N,N-dichloro-p-toluenesulfonamide, N,N-dibromo-p-toluenesulfonamide, N,N-dichloro-o-toluenesulfonamide, N,N-dibromo-o-toluenesulfonamide, N,N-dichloro-p-chlorobenzenesulfonamide, N,N-dibromo-p-chlorobenzenesulfonamide, N,N-dichloro-p-bromobenzenesulfonamide, N,N-dibromo-p-bromobenzenesulfonamide, N,N-dichloro-p-iodobenzenesulfonamide, and N,N-dibromo-p-iodobenzenesulfonamide, and in addition, use may also be made of N,N,N',N'-tetrachloro-1,3-benzenedisulfonamide, N,N,N',N'-tetrabromo-1,3-benzenedisulfonamide, N,N,N',N'-tetrabromo-1,5-naphthalenedisulfonamide, N,N,N',N'-tetrachloro-1,5-naphthalenedisulfonamide, N,N,N',N'-tetrachlorooxybis(benzenesulfonamide), N,N,N',N'-tetrabromo-oxybis(benzenesulfonamide), N,N,N',N'-tetrachloro-4,4-biphenyldisulfonamide, N,N,N',N'-tetrabromo-4,4-biphenyldisulfonamide, N,N,N',N',N',N'-hexachloro-1,3,5-trisulfonamide, etc. Examples of N-haloamides having a carboxylic acid residue include N,N-dichloroacetamide, N,N-dibromoacetamide, N-chlorosuccinimide, N-bromosuccinimide, etc.

It should be noted that the first component or polymer having a polymerizable side chain is preferably soluble in the second component or organic acid, the vinyl polymer, and a solvent for the adhesive composition.

Furthermore, the first component or polymer having a polymerizable side chain is preferably present in an amount of 10 to 90 parts by weight per 100 parts by weight of the adhesive composition.

The polymerizable organic acids which may be used in the present invention as the second component are preferably acylic acid and methacrylic acid. The organic acids may be effectively blended in amounts of 4 to 80 parts by weight per 100 parts by weight of the final adhesive composition containing them. The organic acids fail to provide satisfactory results for both water resistance and adhesion when blended in amounts less than 4 parts by weight or more than 80 parts by weight.

It is preferable to blend a polymerizable vinyl monomer into the adhesive composition of the present invention in addition to the first and second components. Examples of the polymerizable vinyl monomers which can be used in the practice of the invention include methyl methacrylate, ethyl methacrylate, acrylonitrile, methacrylonitrile, methyl acrylate, ethyl acrylate, butyl methacrylate, cyclohexyl methacrylate, hexyl methacrylate, 2-ethylhexyl methacrylate, lauryl methacrylate, butyl acrylate, cyclohexyl acrylate, hexyl acrylate, 2-ethylhexyl acrylate, tridecyl methacrylate, tetrahydrofurfuryl methacrylate, dimethylaminoethyl methacrylate, diethylaminoethyl methacrylate, stearyl methacrylate, glycidyl methacrylate, ethyl dimethacrylate, 1,3-butyl dimethacrylate, benzyl methacrylate, 2-hydroxypropyl methacrylate, trimethylolpropane trimethacrylate, pentaerythritol tetramethacrylate, t-butyl methacrylate, isobutyl methacrylate, 2-hydroxyethyl methacrylate, triethylene glycol dimethacrylate, tetraethylene glycol dimethacrylate, trimethylolpropane triacrylate, or condensates of methacrylic and acrylic acids with bisphenol-A diglycidyl, diisocyanate, epichlorohydrin, and the like, styrene, styrene derivatives such as α-methylstyrene, β-methylstyrene, and divinylbenzene, vinyl acetate, vinyl pyridine, acrylamide, methacrylamide, and analogues, and one or more members may be selected among these monomers by taking into account their compatibility with the first component or polymer having a polymerizable side chain, the performance of the composition, and the like.

These vinyl monomers may preferably be present in an amount of 0 to 80 parts by weight, particularly 0.5 to 80 parts by weight per 100 parts by weight of the adhesive composition.

To the adhesive composition of the present invention is added a polymerization catalyst. The polymerizing/curing catalysts which can be used in the present invention are preferably well-known organic peroxides and hydroperoxides. The polymerizing/curing catalysts are blended in an amount of 0.05 to 10 parts by weight, preferably 0.1 to 5 parts by weight per 100 parts by weight of the adhesive composition. The polymerizing/curing time is extended with amounts of less than 0.05 parts by weight whereas amounts exceeding 10 parts by weight generally give rise to no advantageous effect, substantially reduce the shelf life, and undesirably increase the cost. Examples of the organic peroxides and hydroperoxides include ketone peroxides such as methyl ethyl ketone peroxide, hydroperoxides such as t-butyl hydroperoxide and cumene hydroperoxide, dialkyl peroxides such as dicumyl peroxide, diacyl peroxides such as acetyl peroxide, peroxyesters such as t-butylperoxide benzoate, and the like.

In the practice of the invention, to promote the reaction of such a radical forming agent, a variety of well-known compounds may be used alone or in combination, including tertiary amine compounds such as N,N-dimethylaniline, N,N-dimethyltoluidine, N,N-diethylaniline, guanidine, N,N-diisopropyl(p-toluidine), etc., naphthenates of cobalt, nickel, manganese, iron, and similar metals, iron propionate, copper octanate, iron hexoate, aldehydeamine condensates, tetrahydroquinoline, vanadium compounds, acetylacetone, acetoacetic ester, dimedone, etc. These reaction accelerators may be used in effective amounts and applied to one or both of adherends as a primer alone or in the form of a solution in a suitable solvent. Alternatively, the adhesive composition may be divided into two parts, and the radical forming agent is added to one part and the reaction accelerator is added to the other part. The two parts are mixed upon use. Where the shelf life of the adhesive composition is not particularly important, the reaction accelerator may be added to the composition without dividing it into two.

The adhesive composition of the present invention may further contain a small amount of a well-known polymerization inhibitor in order to improve its shelf life. Examples of the inhibitors include quinones such as p-benzoquinone, phenols such as hydroquinone monomethyl ether and 2,6-di-t-butyl-p-cresol, polyhydric phenols such as 2,5-di-t-butyl-hydroquinone, and the like.

A well-known silane coupling agent may be added to the adhesive composition of the invention in order to improve its adhesion to glass, for example, and the adhesive composition may further contain silica, clay, carbon black, inorganic and organic short fibers, calcium carbonate, a coloring agent, and other additives in adequate amounts.

Further, the adhesive composition of the present invention may contain a solvent. The solvent which can be used herein may be any one of the solvents listed in connection with the preparation of the polymer or first component.

The adhesive composition of the present invention may be prepared by adding to the polymer or first component, necessary amounts of the organic acid or second component and the polymerization catalyst, and preferably the vinyl monomer and other optional additives. If, in preparing the polymer or first component, the organic acid or second component is added as the polymerizable unsaturated monomer to be reacted with a material having a molecular weight of at least 500 in an excessive amount, that is, in excess of the amount required to react with the material having a molecular weight of at least 500 (this excess of organic acid serves as a solvent in preparing the polymer or first component), or the vinyl monomer is used as a solvent, then the resulting reaction mixture including the polymer or first component contains the excess of organic acid or second component or the vinyl monomer or another solvent. Then, the adhesive composition may be obtained from this reaction mixture, simply by adding the polymerization catalyst and optional additives thereto. Since the organic acid and/or the vinyl monomer has been added to said reaction mixture in this case, it is not necessarily required to add the organic acid and vinyl monomer to the reaction mixture.

The adhesive composition of the present invention is useful in bonding a variety of metals, plastics, FRP, glass and the like.

The adhesive composition according to the present invention may be used by well-known application techniques. It may be applied to an adherend by choosing any suitable technique from brushing, spraying, dipping, roll coating, and doctor knife coating, for example, depending on the type and shape of the adherend. Further, the adhesive composition of the present invention may be applied with or without dilution with a solvent.

The following examples are illustrative of the present invention, but the present invention is not limited to these examples.

EXAMPLES 1-3

100 g of extremely high acrylonitrile content NBR N-206 (manufactured by Goodyear Co.) was milled on a roll mill, and then placed in a three-necked flask equipped with a stirrer and a dropping funnel where it was prepared into a 10% solution in methyl ethyl ketone. 4.3 g of methacrylic acid was added to the three-necked flask, the contents were thoroughly agitated, and the dropping funnel was then charged with 3.6 g of t-butyl hydrochlorite which was added dropwise to the polymer solution with thorough stirring. During the dropwise addition, the flask was water cooled to keep the reaction solution at a temperature below room temperature. At the end of addition, the reaction solution was poured into a large excess of methanol to recover a modified polymer having a modification rate of 1/3000.

After the modified polymer was repeatedly subjected to purification by dissolving it in methyl ethyl ketone again and pouring the solution into methanol, and then dried in air, it was dissolved in a mixture of methyl methacrylate, methacrylic acid, 2-hydroxyethyl methacrylate, ethylene dimethacrylate, and the like in proportions shown in Table 1. Further addition of a catalyst and a stabilizer resulted in adhesives having the formulation shown in Table 1.

Next, the thus prepared adhesives were applied to the opposing ends of two pure aluminum pieces (specimens) of 3.0 mm thick×100 mm long×25 mm wide so as to provide a bonding area of 25 mm wide×12.5 mm long. The joined aluminum pieces were clamped by a paper clip and allowed to cure. The bonding area of the aluminum pieces was polished with a #100 abrasive paper, degreased with acetone, and coated with a primer in the form of a butylaldehydeamine-aniline condensate before the adhesive was applied. The thus obtained bonding test specimen was allowed to stand for more than 24 hours at room temperature before it was measured for shear bond strength (tensile shear force) using an Instron type tensile tester at a crosshead speed of 5 mm/min. and an ambient temperature of 20° C.

It should be noted that unless otherwise stated, the following examples use the same procedure of preparing bonding test specimens and the same procedure of measuring shear bond strength as above. This is also true when specimens other than aluminum pieces are used.

With respect to the formulation of adhesives shown in the following table, the numerical value for each component is expressed in part by weight.

TABLE 1

|  | Example 1 | Example 2 | Example 3 |
|---|---|---|---|
| 1/3000 modified NBR N206 | 20 | 20 | 20 |
| Methyl methacrylate | 60 | 53 | 60 |
| 2-Hydroxyethyl methacrylate |  |  | 9 |
| Methacrylic acid | 20 | 15 | 9 |
| Ethylene dimethacrylate |  | 2 | 2 |
| Cumene hydroperoxide | 3 | 3 | 3 |
| p-Benzoquinone | 300 ppm | 300 ppm | 300 ppm |
| Shear bond strength kg/cm$^2$ | 167 | 156 | 171 or higher aluminum failure |

It is evident from Table 1 that the adhesive compositions of the present invention have an improved bond strength capable of withstanding a shearing force leading or approximating to adherend failure. It was also found that the adhesives squeezed out of the bonding area well cured to a non-tacky state.

EXAMPLES 4-6

By following the procedure of Examples 1-3 except that block SBR, chloroprene, liquid butadiene, polybutadiene and the like were used in lieu of the NBR used in Examples 1-3, adhesives of the formulation shown in Table 2 were prepared, and evaluated for bond strength using aluminum pieces. The results are shown in Table 2.

TABLE 2

|  | Example 4 | Example 5 | Example 6 |
|---|---|---|---|
| Modified Solprene 414*$^1$ | 25 |  |  |
| Modified chloroprene (CRW)*$^2$ |  | 20 |  |
| Modified liquid polybutadiene*$^3$ |  |  | 26.3 |
| Modified polybutadiene*$^4$ |  |  | 3.7 |
| Methyl methacrylate | 55 | 69 | 54 |
| Methacrylic acid | 20 | 10 | 15 |
| Trimethylolpropane trimethacrylate |  |  | 1 |
| Ethylene dimethacrylate |  | 1 |  |
| Cumene hydroperoxide | 3 | 3 | 3 |
| p-Benzoquinone | 300 ppm | 300 ppm | 300 ppm |
| Epicoat 828*$^5$ |  | 3 |  |
| Shear bond strength kg/cm$^2$ | 160 | 172 or higher aluminum failure | 140 |

*$^1$by Nihon Elastomer K.K. modification rate 1/500
*$^2$by Denki Kagaku K.K. modification rate 1/1000
*$^3$by Nihon Petro-Chemical K.K. modification rate 1/300
*$^4$by Nihon Synthetic Rubber K.K. modification rate 1/300
*$^5$by Shell Chemical K.K., bisphenol-A type epoxy resin The bond strength was measured in the same manner as in Examples 1-3. As evident from Table 2, a variety of modified polymers may be used in the composition of the present invention.

EXAMPLES 7-11, COMPARATIVE EXAMPLE 1

Adhesives shown in Table 3 were prepared by combining the modified Solprene used in Example 4 with varying amounts of methacrylic acid and methyl methacrylate, and measured for bond strength using specimens of mild steel SS 41 and aluminum. The results are shown in Table 3.

TABLE 3

|  | Comparative Example 1 | Example 7 | Example 8 | Example 9 | Example 10 | Example 11 |
|---|---|---|---|---|---|---|
| Modified Solprene 414 (1/500 modification) | 30 | 30 | 30 | 30 | 30 | 30 |
| Methyl methacrylate | 70 | 60 | 50 | 30 | 0 | 65 |
| Methacrylic acid |  | 10 | 20 | 40 | 70 | 5 |
| Cumene hydroperoxide | 0.5 | 0.5 | 0.5 | 0.5 | 0.5 | 0.5 |
| p-Benzoquinone | 300 ppm | 300 ppm | 300 ppm | 300 ppm | 300 ppm | 300 ppm |
| Shear bond strength to mild steel SS 41, kg/cm$^2$ | 90 | 220 | 247 | 245 | 110 | 150 |
| Retention of bond strength after hot water immersion, % | 15 | 67 | 98 | 82 | 10 | 50 |
| Shear bond strength to aluminum, kg/cm$^2$ | 18 | 132 | 160 | 153 | 150 | 100 |
| Retention of bond strength after hot water immersion, % | 33 | 89 | 100 | 100 93 | 70 |  |

Note;
1: Mild steel SS 41 specimens were 1.6 mm thick × 25 mm wide × 100 mm long.
2: Aluminum specimens were 3 mm thick × 25 mm wide × 100 mm long. The bonding area was 12.5 mm long.
3: A butylaldehyde-aniline condensate was used as the primer.
4: The hot water immersion was carried out by immersing a specimen in hot water at 70° C. for 10 hours, and thereafter, allowing it to cool down to room temperature for 14 hours while keeping it immersed. This process constituted one cycle. The data in the Table is the ratio in percent of the bond strength of a specimen having passed five cycles to the initial bond strength.

It is evident from Table 3 that the compositions of the present invention exhibit a high bond strength and retain the water resistance at a high level in the presence of effective amounts of methacrylic acid.

EXAMPLES 12-14, COMPARATIVE EXAMPLE 2

Adhesives having the formulation shown in Table 4 were prepared using acrylic acid in lieu of the methacrylic acid, and evaluated for bond strength in the same manner as in Examples 7-11.

TABLE 4

|  | Example 12 | Example 13 | Example 14 | Comparative Example 2 |
|---|---|---|---|---|
| Modified Solprene 414 (modification rate 1/500) | 25 | 25 | 25 | 25 |
| Methyl methacrylate | 67 | 59 | 51 | 75 |
| Acrylic acid | 8 | 16 | 24 | 0 |
| Cumene hydroperoxide | 0.5 | 0.5 | 0.5 | 0.5 |
| p-Benzoquinone | 300 ppm | 300 ppm | 300 ppm | 300 ppm |
| Shear bond strength to mild steel SS 41, kg/cm$^2$ | 270 | 235 | 259 | 60 |
| Shear bond strength to aluminum, kg/cm$^2$ | 178 | 170 | 155 | 35 |

Primer: A butylaldehyde-aniline condensate was used.

The bonding test specimens were prepared and tested by the same procedures as in Examples 1-3 except that specimens of mild steel were 1.6 mm thick. It is evident from Table 4 that acrylic acid has effectiveness comparable to methacrylic acid.

EXAMPLES 15-18, COMPARATIVE EXAMPLE 3

Adhesives having the formulation shown in Table 5 were prepared using modified Solprenes obtained by tailoring a Solprene 414 base polymer to varying modification rates, and determined for bond strength and setting time using aluminum specimens, with the results shown in Table 5. The setting time used herein is a lapse of time expressed in minute required for an adhesive to cure after being applied to a bonding area, to a state where the bonded area remains relatively immovable under a load of 1 kg. The bonding test specimens were prepared and tested for bond strength by the same procedures as in Examples 1-3.

TABLE 5

|  | Comparative Example 5 | Example 15 | Example 16 | Example 17 | Example 18 |
| --- | --- | --- | --- | --- | --- |
| Modified Solprene 414 | 30 | 30 | 30 | 30 | 30 |
| Modification rate | 0 | 1/3000 | 1/1000 | 1/500 | 1/100 |
| Methyl methacrylate | 50 | 50 | 50 | 50 | 50 |
| Methacrylic acid | 20 | 20 | 20 | 20 | 20 |
| Cumen hydroperoxide | 0.5 | 0.5 | 0.5 | 0.5 | 0.5 |
| p-Benzoquinone | 300 ppm | 300 ppm | 300 ppm | 300 ppm | 300 ppm |
| Shear bond strength to aluminum, kg/cm$^2$ | 60 | 115 | 135 | 160 | gelled |
| Setting time, min. | 30 | 5 | 2 | $\leq 1$ | — |

Primer: A butylaldehyde-aniline condensate was used.

It is evident from the above Table that a polymer with a modification rate of less than 1/3000 fails to achieve high bond strength and results in an extremely extended setting time. A polymer with a modification rate of higher than 1/100 caused the adhesive to get to an unmeasurable state.

EXAMPLE 19

Aluminum specimens of 3 mm thick×25 mm wide×100 mm long were bonded with the adhesive of Example 3 over a lap length of 12.5 mm, allowed to stand for 1 hour in a thermostatic chamber at a given temperature, and then measured for shear bond strength at the temperature. The results are expressed in relative values to measurements at 20° C. which are all converted to be 100.

TABLE 6

|  | 20° C. | 60° C. | 100° C. | 120° C. |
| --- | --- | --- | --- | --- |
| Adhesive of Example 3 | 100 | 90 | 85 | 75 |
| Commercial SGA, primer type | 100 | 80 | 65 | 55 |
| Commercial structural anaerobic adhesive | 100 | 60 | 25 | 15 |
| Commercial modified acrylic adhesive, two-package type | 100 | 65 | 25 | $\approx 0$ |
| Commercial thermosetting epoxy adhesive | 100 | 100 | 68 | 23 |

Further, the adhesive of Example 3 showed no reduction in bond strength after heat aging at 100° C. for 30 days. Rather, it showed an increase in bond strength after exposure to an atmosphere at 150° C. over 2 hours.

It is thus evident that the composition of the present invention has remarkably improved heat resistance.

EXAMPLE 20, COMPARATIVE EXAMPLES 4-5

Mild steel SS 41 specimens (1.6 mm thick×25 mm wide×100 long) were bonded with the adhesive of Example 3 (bonding joint 25 mm long) and subjected to a fatigue test using a hydraulic servo-controlled fatigue tester (manufactured by Saginomiya Mfg. K.K., Servo-Pack 10). With the specimen stretched under a static stress of 400 kg, a dynamic stress was further applied to it at a frequency of 10 Hz to count the number of stress cycles until fatigue failure occurred in the specimen.

TABLE 7

|  | Example 20 | Comparative Example 4 | Comparative Example 5 |
| --- | --- | --- | --- |
| Adhesive | Adhesive of Example 3 | Commercial SGA primer type | Commercial one-package thermo-setting epoxy adhesive |
| Dynamic stress ± 100 kg |  |  |  |
| Stress ± 150 kg | >100 × 10$^5$ |  |  |
| Stress ± 200 kg | 24 × 10$^5$ | 5.6 × 10$^5$ | 3.9 × 10$^5$ |
| (Stress ±100 kg row) | >100 × 10$^5$ | 10-41 × 10$^5$ |  |

The composition of the present invention has improved fatigue resistance over commercially available modified acryl structural adhesives as well as over epoxy structural adhesives.

EXAMPLES 21-26

Adhesives having the formulation shown in Table 8 were prepared by tailoring Solprene 414 to a modification rate of 1/500 and adding typical polymerization inhibitors, and measured for bond strength. Example 26 used as the radical forming agent methyl ethyl ketone peroxide in lieu of cumene hydroperoxide. The shear bond strength was measured by the same procedure as in Examples 1-3 using aluminum pieces.

TABLE 8

|  | Example 21 | Example 22 | Example 23 | Example 24 | Example 25 | Example 26 |
| --- | --- | --- | --- | --- | --- | --- |
| Modified Solprene | 30 | 30 | 30 | 30 | 30 | 30 |
| Methyl methacrylate | 35 | 35 | 35 | 35 | 35 | 35 |
| Methacrylic acid | 35 | 35 | 35 | 35 | 35 | 35 |
| Cumene hydroperoxide | 1 | 1 | 1 | 1 | 0.5 | 0 |
| Methyl ethyl ketone peroxide |  |  |  |  |  | 0.5 |
| p-Benzoquinone | 300 ppm |  |  |  | 300 ppm | 300 ppm |
| Hydroquinone |  | 300 ppm | 1000 ppm |  |  |  |
| 2,6-Di-t-butyl-4-methyl-phenol |  |  |  | 100 ppm |  |  |
| Shear bond | 160 | 155 | 150 | 150 | 162 | 140 |

TABLE 8-continued

| | Example | | | | | |
|---|---|---|---|---|---|---|
| | 21 | 22 | 23 | 24 | 25 | 26 |
| strength, kg/cm² | | | | | | |

It is evident from Table 8 that a wide variety of polymerization inhibitors may be added to the compositions of the present invention without detracting from their bond strength and that methyl ethyl ketone peroxide is also an effective radical forming agent.

EXAMPLES 27–31

The adhesives shown in Table 8 were measured for shear bond strength when they were applied to an adherend of FRP.

TABLE 9

| | Example | | | | | Reference |
|---|---|---|---|---|---|---|
| | 27 | 28 | 29 | 30 | 31 | Example 1 |
| Modified extremely high acrylonitrile content NBR (1/3000 modification) | 20 | | | | | Commercial SGA |
| Modified Solprene 414 (1/500 modification) | | 25 | 25 | 30.4 | 25 | |
| Poly(methyl methacrylate) | | | 10 | 10 | | |
| Methyl methacrylate | 60 | 45 | 45 | 57 | 45 | |
| Methacrylic acid | 13 | 30 | 30 | 12.9 | 30 | |
| 2-Hydroxyethyl methacrylate | 5 | | | | | |
| Ethylene dimethacrylate | 2 | | | | | |
| Silane-treated caly*1 | | | | | 20 | |
| Cumene hydroperoxide | | | 0.5 | 0.5 | 0.5 | |
| Methyl ethyl ketone peroxide | | 3 | | | | |
| p-Benzoquinone | 300 ppm | 300 ppm | 300 ppm | 300 ppm | 300 ppm | |
| Shear bond strength to FRP for SMC use (filled with glass 30% and calcium carbonate), kg/cm² | | 54 adherend failure*2 | | | | 47 partial adherend failure |
| Shear bond strength to low shrinkage resin FRP, kg/cm² | 54 adherend failure | 63 adherend failure | 58 adherend failure | 56 adherend failure | 76 adherend failure | 13 |

Primer: 50% solution of 1/1 dimethylaniline/cobalt naphthenate in methyl ethyl ketone. The primer specified by the manufacturer was used for commercial SGA.
Specimen: 3 mm thick × 25 mm wide × 100 mm long, lap length 12.5 mm, stress rate 5 mm/min. at room temperature.
*1 γ-methacryloxypropyl trimethoxysilane-treated clay
*2 The adherend was broken.

It is evident from Table 9 that the compositions of the present invention bond well to FRP material.

EXAMPLES 32–34

These examples demonstrate the bond strength of an adhesive when the gap between adherends is changed. The adhesive composition bonded the adherends well even when they were spaced a part by a large gap. The adhesive composition used was the adhesive of Example 31.

TABLE 10

| | Example | | |
|---|---|---|---|
| | 32 | 33 | 34 |
| Gap, mm | 0.05 | 0.6 | 0.8 |
| Low shrinkage FRP Shear bond strength for bonded resin pieces | 76 adherend failure | 68 adherend failure | 51 |

EXAMPLE 35

A composition of the present invention having the formulation shown in Table 11 was measured for bond strength to nylon, polyester resin, and glass plate. The bond strength to glass was evaluated in terms of compression shear strength.

TABLE 11

| | Example 35 | Reference Example 2 |
|---|---|---|
| Modified Solprene 414 (1/500 modification) | 25 | Commercial SGA |
| Methyl methacrylate | 45 | |
| Methacrylic acid | 30 | |
| Cumene hydroperoxide | 0.5 | |
| p-Benzoquinone | 300 ppm | |
| Adherend | | |
| Nylon-6*1 | 28 | 15 |
| Nylon-12*2 | 17 | 11 |
| Nylon-6 (15% glass filled) | 26 | — |
| Polybutylene terephthalate*3 (glass and mica filled) | 51 | 49 |
| Polyethylene terephthalate*4 | adherend failure | partial adherend failure |
| Glass plate,*5 5 mm thick | ≧120 | ≧120 |
| | adherend failure | adherend failure |

Primer: a butylaldehyde-aniline condensate.
*1 by Torey K.K. 3 mm thick × 25 mm wide × 100 mm long
*2 by Daicell K.K. 1.8 mm thick × 25 mm wide × 100 mm long
*3 by Torey K.K. 2 mm thick × 25 mm wide × 100 mm long
*4 by duPont 4 mm thick × 25 mm wide × 100 mm long
*5 5 mm thick × 25 mm wide × 50 mm long, bonded joint 5 mm × 25 mm, acetone cleaning, bond strength evaluated in the compression direction.

The other test specimens were tested at a stress rate of 5 mm/min. and room temperature with a joint length of 12.5 mm. The specimens were previously polished with a #100 abrasive paper and degreased with acetone.

EXAMPLE 36

A composition of the present invention shown in Table 12 was interposed between mild steel pieces of 1.6 mm thick × 25 mm wide × 100 mm long (bonded joint 25 mm × 12.5 mm long), allowed to cure in the absence of a curing accelerator (or primer), and measured for shear bond strength after 24 hours and 48 hours at 20° C. The test pieces were previously polished with a #100 abrasive paper and cleaned with acetone. As seen from Table 12, the composition of the present invention cured well under anaerobic conditions to a high bond strength.

TABLE 12

|  | Example 36 | Reference Example 3 |
|---|---|---|
| Modified Solprene 414 (1/500 modification) | 225 | Commercial SGA |
| Methyl methacrylate | 45 |  |
| Methacrylic acid | 30 |  |
| Cumene hydroperoxide | 1.0 |  |
| p-Benzoquinone | 300 ppm |  |
| Shear bond strength to mild steel SS 41 |  |  |
| kg/cm$^2$ after 24 hrs. at 20° C. | 180 | 0 |
| kg/cm$^2$ after 48 hrs. at 20° C. | 215 | 0 |

EXAMPLE 37

A pair of mild steel SS 41 discs (diameter 40 mm, thickness 10 mm, central grab diameter 12 mm) were bonded to each other with a composition of the present invention shown in Table 13, and tested for tensile bond strength using an Instron tester at a stress rate of 5 mm/min. The bonded area was 12.56 cm$^2$.

TABLE 13

|  | Example 37 | Reference Example 4*[1] | Reference Example 5*[2] |
|---|---|---|---|
| Modified Solprene 414 (1/500) | 25 | Commercial structural anaerobic adhesive | Commercial SGA |
| Methyl methacrylate | 45 |  |  |
| Methacrylic acid | 30 |  |  |
| Cumene hydroperoxide | 3 |  |  |
| p-Benzoquinone | 300 ppm |  |  |
| Primer butylaldehyde-aniline condensate | primed |  |  |
| Tensile bond strength kg/cm$^2$, room temp. | 220 | 136 | 156 |

*[1], *[2] Primers were used as specified by the manufacturers.

It is evident from Table 13 that the composition of the present invention has remarkably improved tensile bond strength over the conventional adhesives.

We claim:

1. An anaerobic adhesive composition, comprising:
   10 to 90 parts by weight per 100 parts by weight of the composition of a polymer having a polymerizable side chain and a molecular weight of at least 500 which is a product obtained by reacting a material having a carbon-to-carbon unsaturated double bond and a molecular weight of at least 500 with a polymerizable unsaturated monomer selected from the group consisting of methacrylic acid, acrylic acid and a mixture thereof in the presence of an alkyl hypohalite or an N-haloamide compound represented by the general formula:

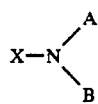

wherein X represents a halogen atom, A represents a carboxylic acid residue, sulfonic acid residue or carbonic acid monoester, and B represents a hydrogen atom, halogen atom or carboxylic acid residue so that a methacryloyloxy or acryloyloxy group is present in an amount of 1/200 to 1/3000 molar equivalent based on the unit weight of the material having a carbon-to-carbon unsaturated double bond and a molecular weight of at least 500;

4 to 80 parts by weight per 100 parts by weight of the final adhesive composition of an organic acid selected from the group consisting of methacrylic acid, acrylic acid and a mixture thereof; and an organic peroxide polymerization catalyst, said adhesive composition having a sheer bond strength to mild steel of at least 110 kg/cm$^2$.

2. The composition according to claim 1, which further comprises a vinyl monomer.

3. The composition according to claim 1 or 2, wherein said material having a molecular weight of at least 500 is selected from the group consisting of natural rubber, polyisoprene, polybutadiene, polychloroprene, butadiene-styrene copolymers, butadiene-acrylonitrile copolymers, butadiene-acrylic acid copolymers, butadiene-methacrylic acid copolymers, butadiene-methyl acrylate copolymers, butadiene-methyl methacrylate copolymers, butadiene-vinyl pyridine-styrene copolymers, ethylene-propylene-cyclopentadiene copolymers, ethylene-propylene-5-ethylidene-2-norbornene copolymers, ethylene-propylene-1,4-hexadiene copolymers, isobutylene-isoprene copolymers, halogenated or highly unsaturated derivatives of isobutylene-isoprene copolymers, norbornene ring-opened polymers and mixtures thereof.

4. The composition according to claim 2, wherein the vinyl monomer is present in an amount of 0.5 to 80 parts by weight per 100 parts by weight of the adhesive composition.

5. An anaerobic adhesive composition, consisting essentially of:
   10 to 90 parts by weight per 100 parts by weight of the composition of a polymer having a polymerizable side chain and a molecular weight of at least 500 which is a product obtained by reacting a material having a carbon-to-carbon unsaturated double bond and a molecular weight of at least 500 with a polymerizable unsaturated monomer selected from the group consisting of methacrylic acid, acrylic acid and a mixture thereof in the presence of an alkyl hypohalite or an N-haloamide compound represented by the general formula:

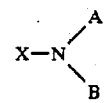

wherein X represents a halogen atom, A represents a carboxylic acid residue, sulfonic acid residue or carbonic acid monoester, and B represents a hydrogen atom, halogen atom or carboxylic acid residue so that a methacryloyloxy or acryloyloxy group is present in an amount of 1/200 to 1/3000 molar equivalent based on the unit weight of the material having a carbon-to-carbon unsaturated double bond and a molecular weight of at least 500;

4 to 80 parts by weight per 100 parts by weight of the final adhesive composition of an organic acid selected from the group consisting of methacrylic acid, acrylic acid and a mixture thereof; and an organic peroxide polymerization catalyst, said adhesive composition having a sheer bond strength to mild steel of at least 110 kg/cm$^2$.

6. An anaerobic adhesive composition, comprising:
   10 to 90 parts by weight per 100 parts by weight of the composition of a polymer having a polymerizable side chain and a molecular weight of at least 500 which is a product obtained by reacting a material having a carbon-to-carbon unsaturated double bond and a molecular weight of at least 500 with at least one polymerizable unsaturated monomer represented by the general formulas:

$$H_2C=\underset{\underset{COOH}{|}}{\overset{\overset{R}{|}}{C}} \quad (I)$$

$$H_2C=\underset{\underset{COO(CH_2)_nOH}{|}}{\overset{\overset{R}{|}}{C}} \quad (II)$$

$$H_2C=\underset{\underset{COO[(CH_2)_mO]_lH}{|}}{\overset{\overset{R}{|}}{C}} \quad (III)$$

wherein R represents a hydrogen atom or a methyl group, n is an integer selected from 2 to 5, m is an integer selected from 1 to 4, and l is an integer from 1 to 30 in the presence of an alkyl hypohalite or an N-haloamide compound represented by the general formula:

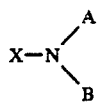

wherein X represents a halogen atom, A represents a carboxylic acid residue, sulfonic acid residue or carbonic acid monoester, and B represents a hydrogen atom, halogen atom or carboxylic acid residue so that a methacryloyloxy or acryloyloxy group is present in an amount of 1/200 to 1/3000 molar equivalent based on the unit weight of the material having a carbon-to-carbon unsaturated double bond and a molecular weight of at least 500;

4 to 80 parts by weight per 100 parts by weight of the final adhesive composition of an orgainic acid selected from the group consisting of methacrylic acid, acrylic acid and a mixture thereof; and an organic peroxide polymerization catalyst, said adhesive composition having a sheer bond strength to mild steel of at least 110 kg/cm².

7. The composition according to claim 6, which further comprises a vinyl monomer.

8. The composition according to claim 7, wherein the vinyl monomer is present in an amount of 0.5 to 80 parts by weight per 100 parts by weight of the adhesive composition.

9. The composition according to claim 5, wherein said polymerization catalyst is a hydroperoxide.

10. The composition according to claim 5, wherein said polymerization catalyst is present in an amount of 0.05 to 10 parts by weight per 100 parts by weight of the adhesive composition.

11. The composition according to claim 5, wherein said polymerization catalyst is present in an amount of 0.1 to 5 parts by weight per 100 parts by weight of the adhesive composition.

12. The composition according to claim 5, wherein said material having molecular weight of at least 500 is a butadiene-acrylonitrile copolymer.

13. The composition according to claim 5, wherein said material having a molecular weight of at least 500 is a butadiene-styrene copolymer.

14. The composition according to claim 5, wherein said material having a molecular weight of at least 500 is a polybutadiene polymer.

15. The composition according to claim 5, wherein said material having a molecular weight of at least 500 is a polychloroprene polymer.

16. The composition according to claim 5, wherein said material having a molecular weight of at least 500 is a natural rubber.

17. The composition according to claim 5, wherein said material having a molecular weight of at least 500 is a polyisoprene polymer.

18. The composition according to claim 5, wherein the organic peroxide polymerization catalyst is selected from the group consisting of ketone peroxides, hydroperoxides, dialkyl peroxides, diacyl peroxides and peroxyesters.

* * * * *